(12) United States Patent
Eccles et al.

(10) Patent No.: US 6,456,624 B1
(45) Date of Patent: Sep. 24, 2002

(54) NETWORK ADDRESS RESOLVE BLOCKER

(75) Inventors: James F. Eccles, Londonderry; Steven Beaudette, Nashua, both of NH (US)

(73) Assignee: Enterasys Networks, Inc., Portsmouth, NH (US)

( * ) Notice: Subject to any disclaimer, the term of this patent is extended or adjusted under 35 U.S.C. 154(b) by 0 days.

(21) Appl. No.: 08/960,010

(22) Filed: Oct. 29, 1997

(51) Int. Cl.[7] .......................... H04L 12/28; H04L 12/50
(52) U.S. Cl. ................... 370/400; 370/400; 370/401; 370/360
(58) Field of Search ................... 370/253, 254, 370/255, 389, 392, 400, 401, 402, 403, 432, 390, 475, 229, 230, 231, 235, 360

(56) References Cited

U.S. PATENT DOCUMENTS

| | | | | |
|---|---|---|---|---|
| 5,229,992 A | * | 7/1993 | Jurkevich et al. | 370/82 |
| 5,402,416 A | * | 3/1995 | Gieslak et al. | 370/60 |
| 5,485,455 A | * | 1/1996 | Dobbins et al. | 370/60 |
| 5,799,073 A | * | 8/1998 | Fleischer, III et al. | 379/113 |
| 5,825,772 A | * | 10/1998 | Dobbins et al. | 370/396 |
| 5,852,721 A | * | 12/1998 | Dillon et al. | 395/200.47 |

OTHER PUBLICATIONS

Comer, Douglas E., "Internetworking", Internetworking with TCP/IP—vol. I, Principles, Protocols, and Architecture, 1991, Chapter 11, pp. 73–82, Prentice–Hall, Inc., Englewood Cliffs, New Jersey.

Stallings, William, "Mapping Internet Addresses to Physical Addresses (ARP)", Data and Computer Communications, 1994, Chapter 5, pp. 471–501, MacMillan Publishing Company, New York, New York.

* cited by examiner

*Primary Examiner*—Daniel Hunter
*Assistant Examiner*—Meless Zewdu
(74) *Attorney, Agent, or Firm*—Wolf, Greenfield & Sacks, P.C.

(57) ABSTRACT

A switch for selectively precluding the issuance of interswitch resolve packets. When the address of a destination node is not able to be resolved by an interswitch resolve packet, the destination identifier for the packet is stored in an unresolved address table. The unresolved address table includes a destination identifier of the packet, a counter and one or more timers. When the value of the counter reaches a test count value it is determined whether or not the packets have been sent at a rate (indicated by a threshold value) that would unduly degrade the performance of the network. If the resolve packets are unduly loading the network, then the destination identifier is forwarded to a blocked address table. Subsequent issuance of interswitch resolve packets having the destination identifier are selectively filtered to ensure that they do not unduly degrade the performance of the computer network. Some resolve requests are still permitted so that when the node having the destination identifier is subsequently returned to the network, the address may be resolved. With such an arrangement, address resolution may be achieved while maintaining the performance of the computer network.

12 Claims, 5 Drawing Sheets

NETWORK ADDRESS RESOLVE BLOCKER

FIELD OF THE INVENTION

This invention relates generally to the field of networking and more specifically to a method and apparatus for maintaining network performance while resolving unknown destination addresses in a switched network.

BACKGROUND OF THE INVENTION

Computer systems communicate with each other via a network. One example of a networking architecture that allows different computer systems (hereinafter also referred to as nodes) to exchange data and commands is a "switched" network architecture. In a switched network architecture, multiple nodes are coupled together via a switch to form a local switched network. Larger networks are provided by interconnecting the switches in different local networks. With such an arrangement, different nodes coupled to different local switches may exchange data by transferring data and commands between the switches of the different local networks. Data and commands are typically transferred between a source node and a destination node in a packet format. The packet may include a source identifier, identifying the source node that issued the packet, and a destination identifier, identifying the destination node (i.e., the node to which the packet is to be transferred), along with the commands and/or data.

Each switch in the network includes a directory for storing node location information that can be used to determine a path between the source and destination nodes in the network. The information, which may be in the form of an address that includes a switch address and a node address, is determined during an operational phase known as address resolution. During this phase, as a packet is received by the switch, the destination identifier of the packet is compared with the information in the directory of the switch, and, in response to the information, the packet is forwarded either directly to a node coupled to the switch, or to another switch to enable the packet to reach the appropriate destination node.

A problem arises during the address resolution phase when a packet is received and the directory in the receiving (local) switch includes no information for that packet destination. When this occurs, the local switch must determine the location of the destination node. One method of determining a location is to have the local switch issue an interswitch resolve packet to all the interconnected switches in the network. The interswitch resolve packet includes a resolve command and the destination identifier of the packet. Each switch that receives the interswitch resolve packet accesses its directory to search for the destination identifier. If any switch has such information, it responds to the interswitch resolve packet by forwarding, back to the switch that issued the interswitch resolve packet, an Acknowledgment response that identifies the location of the destination. The original receiving switch may then update its directory, and the packet is forwarded to the destination node.

If the switches that receive the interswitch resolve packet do not have any information for the destination identifier, they respond to the interswitch resolve packet by forwarding an Unknown response. It may occur that all of the switches return an Unknown response, thereby indicating that the destination node is unknown to all of the switches in the network. The destination node may be unknown for two reasons. First, the directory of each switch is typically updated when a node issues a packet or responds to a packet over the network. If one of the nodes is a quiet node, i.e., a type of node that only responds to packets, but rarely initiates packets, it may be that the node has not yet needed to respond to any messages and that therefore the directory in the local switch has not been updated with the address of the quiet node. A second reason that a node may be unknown (to the switches) may be because the node has been temporarily or permanently removed from the network unbeknownst to other computers (nodes) within the network.

When the address of the destination node is not located during the address resolution phase, one method of resolving the location of the destination node is for the local switch (which received the data packet) to broadcast the data packet to all of the nodes in the network. If the destination node is included in the network it will respond to the packet. When the destination node responds to the packet, the location of the destination node is updated in the directories of both the switch local to the destination node and the switch local to the source node. This method of broadcasting packets is particularly successful for discovering the addresses needed to communicate with quiet nodes.

However, the method of broadcasting packets described above cannot obtain location information for nodes that have been temporarily or permanently removed from the network. In addition, when no response is received for the broadcast packet, the broadcast is generally repeated at regular time intervals. The result is that the network may become flooded with packets for destination nodes that are not even connected to the network, thereby degrading the overall performance of the switched network.

SUMMARY OF THE INVENTION

According to one aspect of the invention, a method is provided for enhancing network performance while attempting to resolve destination addresses in a switched network system. The switched network system includes a plurality of interconnected local networks, each of the local networks including a switch and at least one associated node. The method includes the steps of a local switch issuing interswitch resolve packets to the other switches in the network system in response to a packet issued by a node associated with the local switch for access to a destination when the address of the destination is unknown by the local switch, and selectively precluding the issuance of the interswitch resolve packets in order to enhance performance of the switched network system.

According to another aspect of the invention, a switch is provided for use in a switched network system comprising a plurality of interconnected local networks, each local network comprising a switch and at least one associated node. The switch includes a directory for storing addresses of nodes known to the switch. The switch further includes: means for storing a destination identifier of a packet issued by at least one associated node when the address of the destination is not stored in the directory of any of the switches in the switched network; means for issuing interswitch resolve packets to attempt to resolve the destination address; and means for selectively precluding issuance of the resolve packets when an undesirable number of resolve packets have been issued for the destination identifier.

More specifically, the disadvantages of the prior art address resolution methods are overcome in one embodiment of the present invention through the use of an unresolved address table in conjunction with a blocked address table. When the address of a destination node is not able to be resolved, a destination identifier is stored in the unresolved address table, along with a count value, and one or more time stamp values. Also stored at the local switch is a threshold value and a test count value. The test count value indicates a maximum number of interswitch resolve packets that are to be issued for the destination identifier before considering whether to block the same. When the rate of sending resolve packets meets or exceeds the threshold value, the destination identifier is sent to the blocked address table and some or all of the subsequent resolve packets will be filtered (blocked).

More specifically, each time that the address resolution fails, the count associated with the destination identifier is incremented. When the count value reaches the test count value, it is determined whether or not the resolve packets have been sent at a rate (indicated by the threshold value) that would degrade the performance of the network. The rate at which interswitch resolve packets have been issued may be determined by comparing a first time stamp, set when a first interswitch resolve packet (for the destination identifier) is sent over the network, against a second time stamp, set when the last resolve packet (for the destination identifier) was sent over the network. If the rate of packets sent during this time period is greater than or equal to the threshold value, then the sending of interswitch resolve packets is degrading the performance of the network. In an alternative embodiment, the threshold value may specify a time period (as opposed to a rate or frequency), and an acceptable rate may then be determined by comparing the time period specified by the threshold value to the difference between the time stamp values.

When it is determined that the resolve packets are degrading the performance of the network, the destination identifier is forwarded to the blocked address table. Subsequent interswitch resolve packets to the node having the destination identifier are selectively filtered to ensure that they do not unreasonably degrade the computer network. Preferably, some interswitch resolve packets are still permitted to be forwarded over the network so that when the node having the destination identifier is subsequently returned to the network the address may be resolved. With such an arrangement, address resolution may be achieved while enhancing the performance of the computer network.

The invention will be further described with respect to the following detailed description and drawings, which are given by way of example only and are in no way restrictive.

DETAILED DESCRIPTION

A switched network employing a specific embodiment of the switch control logic of the present invention will now be described with regard to the figures, where like numerals refer to like elements in different figures.

Figure 1:
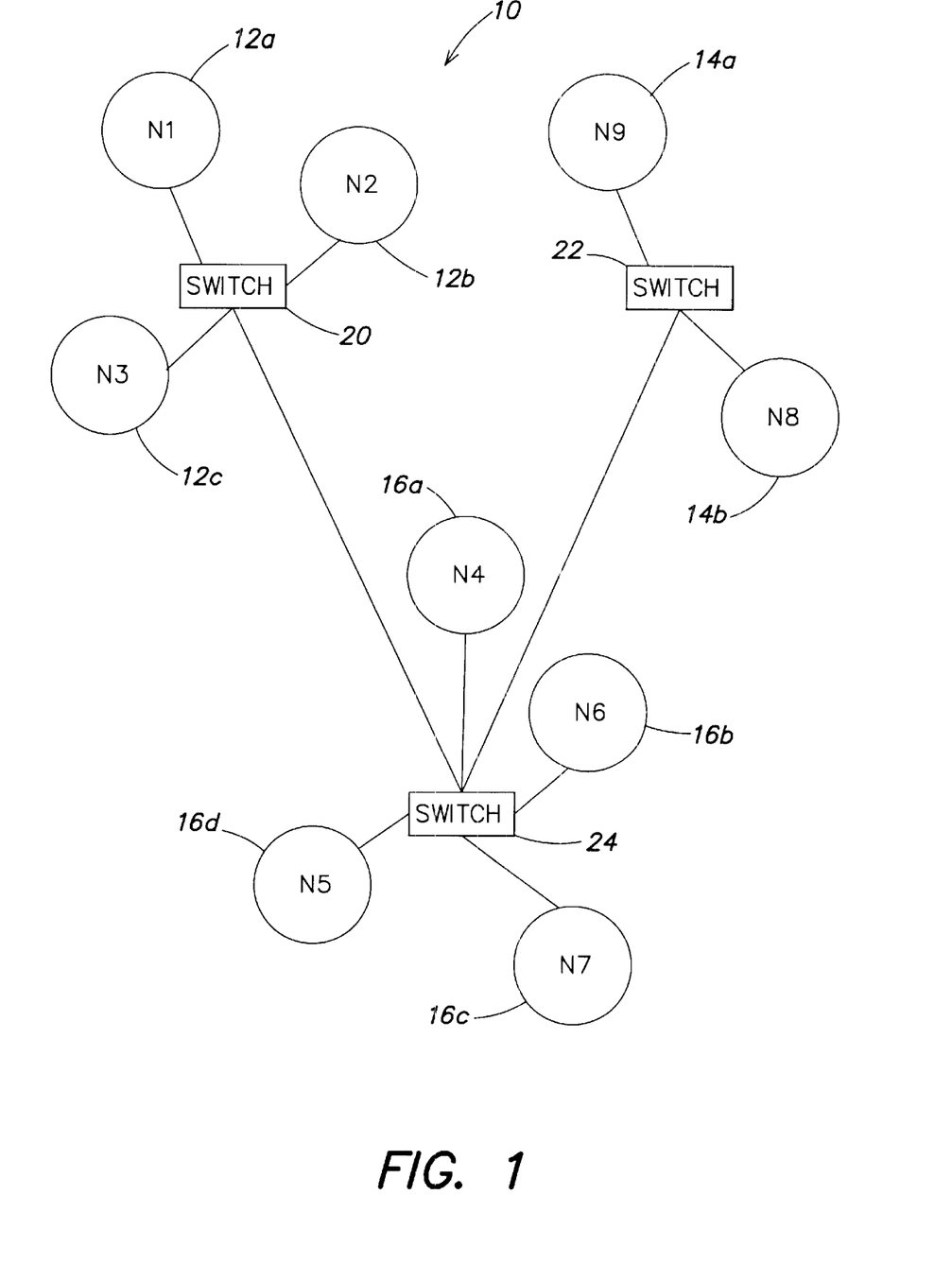
FIG. 1 is a schematic diagram illustrating one embodiment of a switched network in which the present invention may be employed.

FIG. 1 illustrates one embodiment of a switched network 10 including a plurality of nodes N1–N9 interconnected by switches 20, 22, and 24. Nodes that are directly coupled to a switch, such as nodes 12a, 12b and 12c, to switch 20, are hereinafter referred to as "local nodes" relative to that switch. When one of the local nodes (12a, 12b or 12c) issues a packet to another node in the switched network 10, the packet is first forwarded to the local switch (20). A switch that receives a packet from a local node for forwarding to another node is referred to as an "ingress switch". Nodes that are coupled to the ingress switch, such as switch 20, via the other switches, such as switches 24 and 22, are hereinafter referred to as "remote nodes". Accordingly, from the viewpoint of switch 20, nodes 16a–16d and nodes 14a–14b are remote nodes.

Commands and/or data are transferred between all of the nodes in the system via packets. A packet is a group of data bits that are apportioned into any number of fields including, for example, a source identifier field, a destination identifier field, a type field, a command field and a data field. The source identifier identifies the local node that issued the packet to the ingress switch. A destination identifier identifies either the local or remote node to which the packet is to be forwarded. Unicast packets are forwarded to one node indicated in the destination field. Broadcast type packets are forwarded to all of the other nodes in the network, and multicast packets to a subset of nodes.

During operation, any of the nodes coupled to the switches may issue packets to any of the other nodes in the switch network. Packets are first received at the ingress switch, then forwarded to the appropriate local node or remote switch depending upon the value in the destination identifier field. For example, if node 12a desired to issue a packet to node 14b, the packet would first be routed to ingress switch 20, and then through switches 24 and 22 to destination node 14b.

There are two operations that occur at the switches to set up a pathway for the packets. The first operation is referred to as "address resolution". In general, during the address resolution phase the ingress (local) switch parses the packet, determines the destination identifier, and generates an interswitch resolve packet which is sent to the other switches to determine the location of the destination. The interswitch resolve packet includes the destination identifier. An acknowledgement response includes the address of the switch where the destination is located. The second operation is a connectivity phase during which the hardware in the switches is appropriately enabled to allow for the packet to be directly forwarded on a path through the switched network.

As mentioned above, a problem may arise during the address resolution phase if the address of the destination node cannot be determined. When the destination address is not known by the ingress switch, the ingress switch issues interswitch resolve packets to each of the other switches in the network. The interswitch resolve packet requests that the receiving switch access a directory at the receiving switch to determine whether or not it has an address for the destination node. If any one of the switches that receive the interswitch resolve packet knows the address of the destination node, it forwards an Acknowledgment response along with the destination address back to the ingress switch. If the receiving switch does not know the destination node address, it returns an Unknown response. If the ingress switch receives only Unknown responses, prior art systems generally flooded the packet to all of the nodes in the network in an attempt to deliver the packet to the destination node. The above address resolution steps were repeated each time a packet was issued to the destination until the location of the destination node address was determined. Such an address resolution technique undesirably increased the amount of packet traffic on the network, thereby reducing the performance of the network.

According to one embodiment of the invention, in order to maintain network performance while resolving destination node addresses, a method and apparatus are provided for controlling the number of interswitch resolve packets that are issued over the switched network. The method and apparatus selectively blocks certain ones of the interswitch resolve packets to minimize the number of interswitch resolve packets that are issued when resolving a destination node address once a certain number of initial attempts at resolving the destination node address have been unsuccessful.

Figure 2:
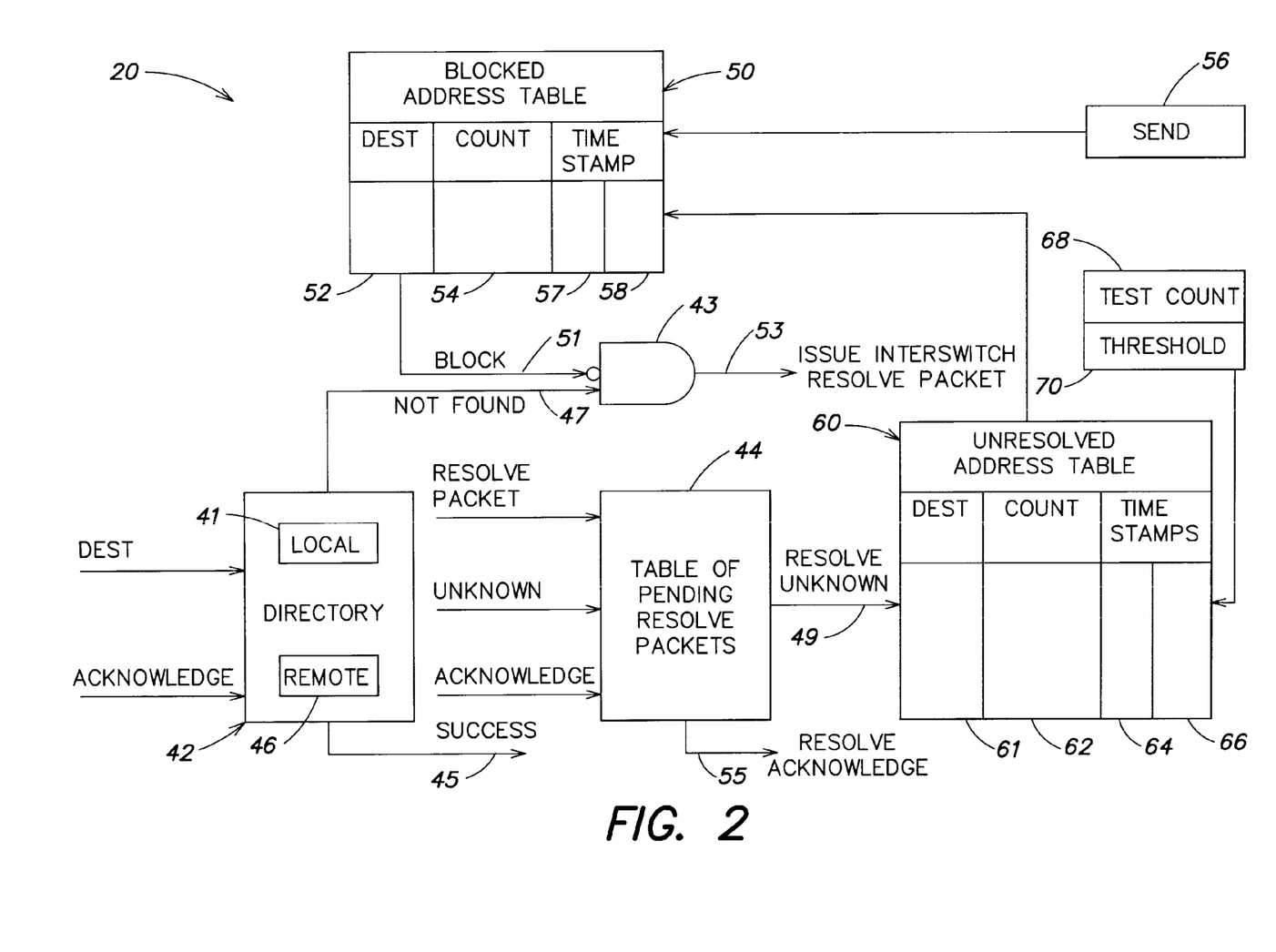
FIG. 2 is a block diagram of one embodiment of a switch according to the invention that may be used in the switched network of FIG. 1.

Referring now to FIG. 2, there is shown one embodiment of a switch 20 including a number of elements that aid in the resolution of destination packet addresses while enhancing overall network performance. These elements may be implemented in either hardware or software, or a combination thereof. A switch suitable for use herein is described in U.S. Pat. No. 5,485,455 to Dobbins et al. entitled "Network Having Secure Fast Packet Switching And Guaranteed Quality Of Service," which issued Jan. 16, 1996.

The switch 20 includes a "directory" 42 coupled to a "table of pending resolve packets" 44. The table 44 is further coupled to an "unresolved address table" 60. The table 60 is coupled to a "blocked address table" 50.

During operation, a packet is received at ingress switch 20 and stored (not shown). A destination identifier (DEST in FIG. 2) from the packet is forwarded to the directory 42. The directory 42 may be, for example, a memory device such as a random access memory (RAM) device or a content addressable memory (CAM) that is used to store routing address information for destination identifiers. The directory is apportioned into a local region 41 and a remote region 43. The local region 41 stores address information for all of the associated nodes that are local to the switch 20. The remote region 46 stores address information for all of the nodes that are remote to the switch 20. The address information may include, for example, a switch address, identifying the destination switch to which the node associated with the destination identifier is coupled, a node address identifying the location of the node relative to its coupled switch, and a port address identifying on which port of the switch the node is connected.

When the packet is received at switch 20, the directory 42 is accessed to determine whether the switch knows the location of the destination node. The node information may be found in either the local or remote region of the directory. If this information is stored in the directory 42 for the destination identifier, a "Success" signal is issued over line 45 to transmit logic of the switch (not shown), and the packet is forwarded through the switched network to the appropriate destination node.

However, if there is no information stored in the switch 20 for the destination identifier, a Not Found signal is forwarded over line 47 to AND gate 43, and (if not blocked by a Block signal on the other input line 51) is used to generate an output signal "Issue Interswitch Resolve Packet" on line 53 which is sent to the transmit logic of the switch. As a result, the transmit logic sends an interswitch resolve packet to all of the other switches in the network 10. The pending resolve packet is stored in table 44. As described above, each of the switches in the network returns either an Acknowledge response (including the destination address) or an Unknown response. If an Acknowledge is returned, the directory 42 is updated with the location information associated with the destination node, and the Success signal is sent over line 45 to the transmit logic of the switch for propagation of the packet to the appropriate destination node.

If an Unknown is returned from all of the coupled switches, a Resolve Unknown signal is sent on line 49 from the table 44 to the unresolved address table 60. The unresolved address table 60 stores a number of fields for indicating the status of the attempts to resolve the address having the destination identifier. These fields include a destination field 61, a count field 62, and a pair of time stamps fields 64 and 66.

The destination field (DEST) 61 stores the destination identifier of the packet. The count field (COUNT) 62 stores a count of the number of times an interswitch resolve packet associated with the destination identifier has been issued to the network and failed to resolve the destination address. First time stamp 64 stores the time that the destination identifier was first stored in the unresolved address table 60. Second time stamp 66 stores the time that the latest unresolved interswitch resolve packet associated with the destination identifier was sent over the network. Also stored at the switch are a test count 68 and a threshold 70. The test count 68 stores a value indicating the maximum number of times that interswitch resolve packets associated with the destination identifier are to be forwarded out over the network before a determination is made as to whether blocking of the packets should be initiated. The threshold 70 stores a value indicating the maximum rate (frequency) at which interswitch resolve packets associated with the destination identifier should be forwarded out over the network before blocking of the packets should be initiated.

During operation, the first time that Unknown responses are received from all of the coupled switches, the destination identifier DEST for the packet is forwarded to the unresolved address table 60 and stored in field 61. The count 62 is set to one, and first time stamp 64 is set to the time of transfer of the DEST. Subsequently, each time that an interswitch resolve packet having the same destination identifier is forwarded out over the network, and Unknown responses are received from all of the coupled switches, a Resolve Unknown signal is sent on line 49 from table 44 to table 60, the count value 62 associated with the destination identifier is incremented by one, and the second time stamp 66 is updated with the current time. Eventually, the value of the count field 62 will equal the predetermined test count value stored in test count 68; the predetermined test count may for example be pre-programmed manually. Alternatively, if the destination address is resolved by an Acknowledge (received at table 44), a Resolve Acknowledge signal is sent on line 55 and the entries in tables 44, 50 and 60 for this destination identifier are deleted.

When a predetermined number of resolve packets are unsuccessful and the value of the count field 62 is equal to the value in test count 68, the relative frequency of sending resolve packets is determined and compared with the threshold value 70. The number N of resolve packets sent (i.e., the value in the counter field 62 which is here equal to the test count 68), divided by the difference between second time stamp 66 and first time stamp 64, is the frequency at which interswitch resolve packets for the destination identifier have been forwarded over the network. If the frequency is less than the threshold value 70, then the interswitch resolve packets are not being issued so frequently that they are significantly degrading the performance of the network. When this occurs (no significant degradation), the count 62 and time stamp values 64, 66 for this destination identifier are reset and counting for the destination identifier is re-initiated the next time that a Resolve Unknown signal is received at table 60.

However, if the frequency determined from the time stamp values 64 and 66 and count value 62 is greater than or equal to the value of the threshold 70, then the interswitch resolve packets are being sent out too frequently, and some of the interswitch resolve packets should be blocked. When this occurs, the destination identifier is forwarded to the blocked address table 50.

Blocked address table 50 receives the destination identifier DEST from field 61 of table 60, and stores the same in field 52 of table 50. As previously described, this occurs when the threshold value 70 has been exceeded. The value in count field 54 is started at 0, and the current time at which the destination identifier is entered into field 52 is set in first time stamp field 57. The next time a packet having the same destination identifier is received at switch 20, and the address is not resolved in directory 42, a Not Found signal is sent on line 47 to AND gate 43. Also at this time, the current time is entered in second time stamp field 58 of table 50. The difference between the values in fields 58 and 57 are compared to a send value 56 supplied to table 50. The send value designates how often resolve packets should be sent (i.e., not blocked) for the destination identifier. If the difference of time stamp fields 58 and 57 is greater than the send value, then no Block signal will be sent on line 51 and an issue interswitch resolve packet will be output on line 53 of the AND gate 43. Alternatively, if an inadequate amount of time has passed, a Block signal will be sent on line 51 (to the NOT input of AND gate 43) and no resolve packet will be sent. First time stamp 57 is updated each time a resolve packet is sent (not blocked). Second time stamp 58 is incremented with the current time each time a next packet with the destination identifier arrives at the switch 20. When the resolve packet is not blocked, the value in field 58 is transferred to field 57.

Accordingly, the blocked address table 50 effectively filters (reduces) the number of interswitch resolve packets that are forwarded out over the network to alleviate network loading problems. By setting the send value 56 to a desired level it can be ensured that periodic resolve requests will still be propagated out to the network and eventually resolve the destination address when, for example, the destination node is returned to the system. As with threshold value 70, send value 56 may be a frequency or a time period from which a corresponding frequency is determined.

Figure 3:
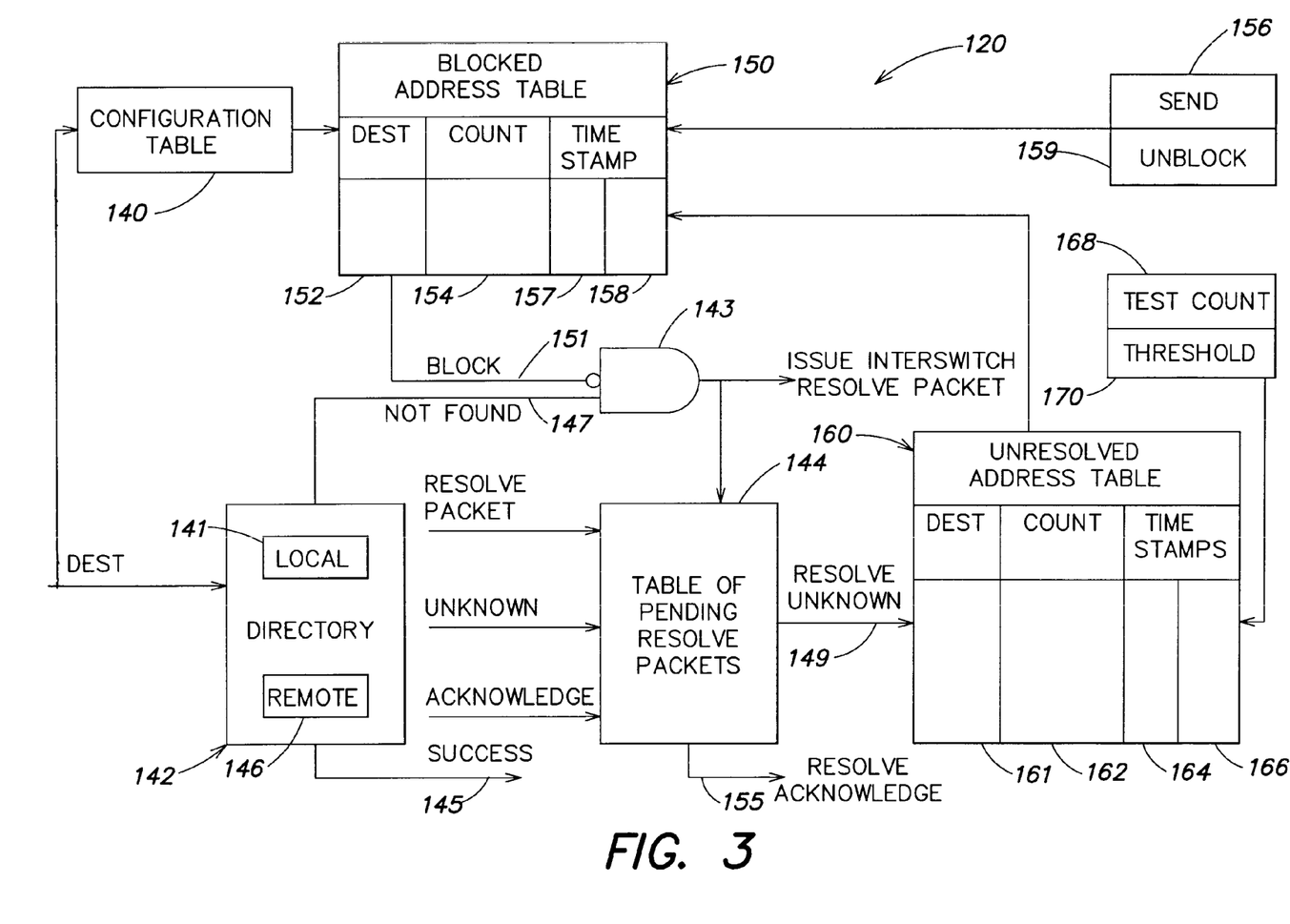
FIG. 3 is a block diagram of a second embodiment of a switch according to the invention that may be used in the switched network of FIG. 1.

Referring now to FIG. 3, a second embodiment of a switch 120 is shown wherein like elements have like reference numbers, but incremented by "100". Switch 120 further includes a "configuration table" 140—a programmable table that stores destination identifiers of nodes that should not be blocked by the "blocked address table" 150. Table 140 may be configured by a user to preclude the blocking of interswitch resolve packets to certain addresses. For example, the user may want to ensure that interswitch resolve packets continue to be forwarded out to the network if the destination identifier is a crucial destination for a node or switch, or for the network as a whole. One example is a system manager node, to which communication must be restored as soon as possible (i.e., to signal error conditions or the like); it may thus be desirable to load the network with interswitch resolve packets to attempt to resolve the location of the system manager node.

Still further, as illustrated in FIG. 3, an unblock value 159 is provided to determine a time at which a blocked address (destination identifier) may be removed from the blocked address table 150. For example, if the number of accesses to the resolve destination is relatively low or a large amount of time has passed between resolve requests, it may be desirable to stop blocking the destination identifier. The unblock value 159 may therefore be a frequency value that will result in the removal of the address from the table. Alternatively, it may be a time value, where the blocked address is removed from the table if the difference between the time stamps 157 and 158 is greater than the unblock value.

Figure 4A:
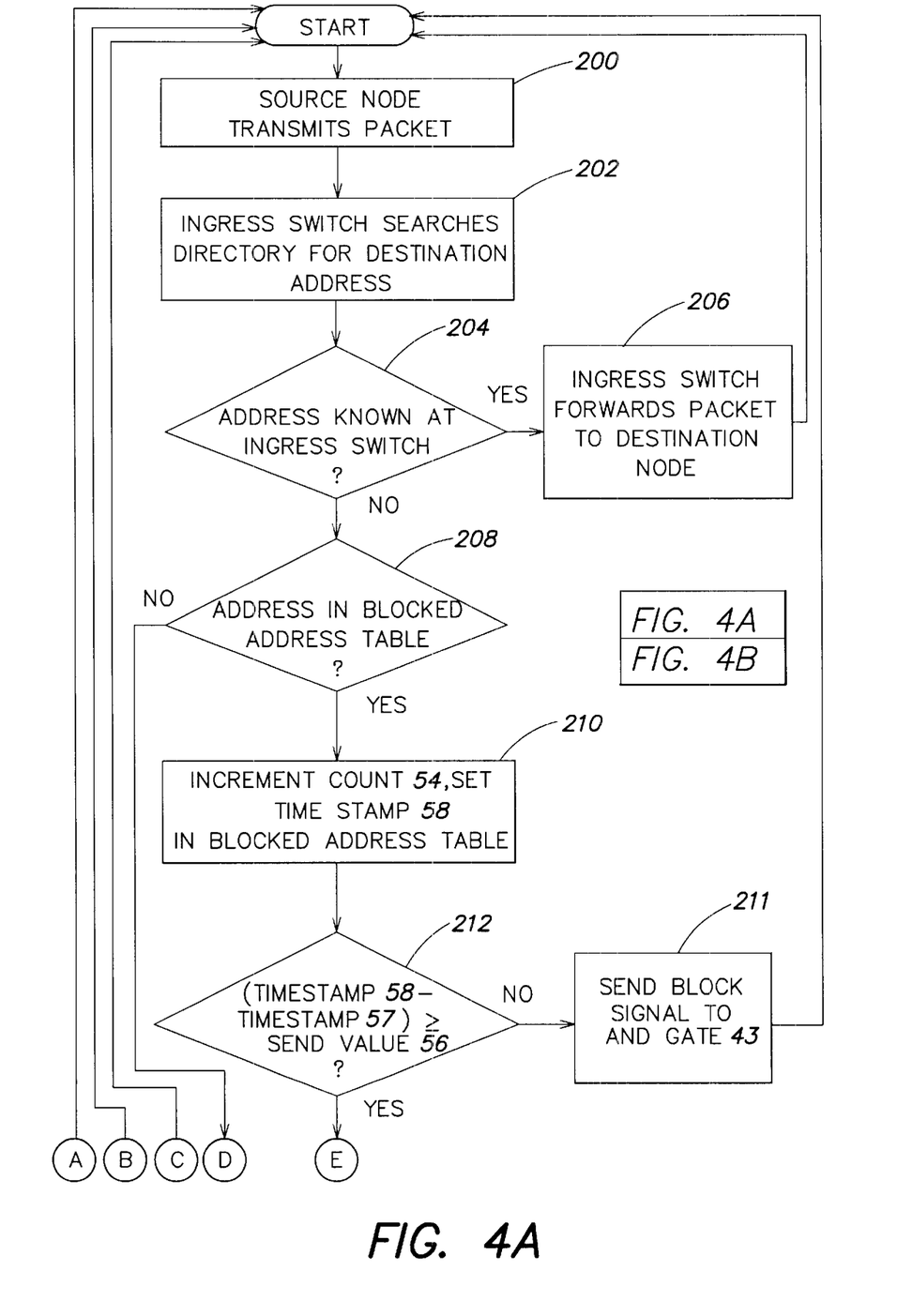
FIGS. 4A and 4B are flow diagrams of a method used by the switch of FIG. 2 for handling unresolved addresses in the network of FIG. 1.
Figure 4B:
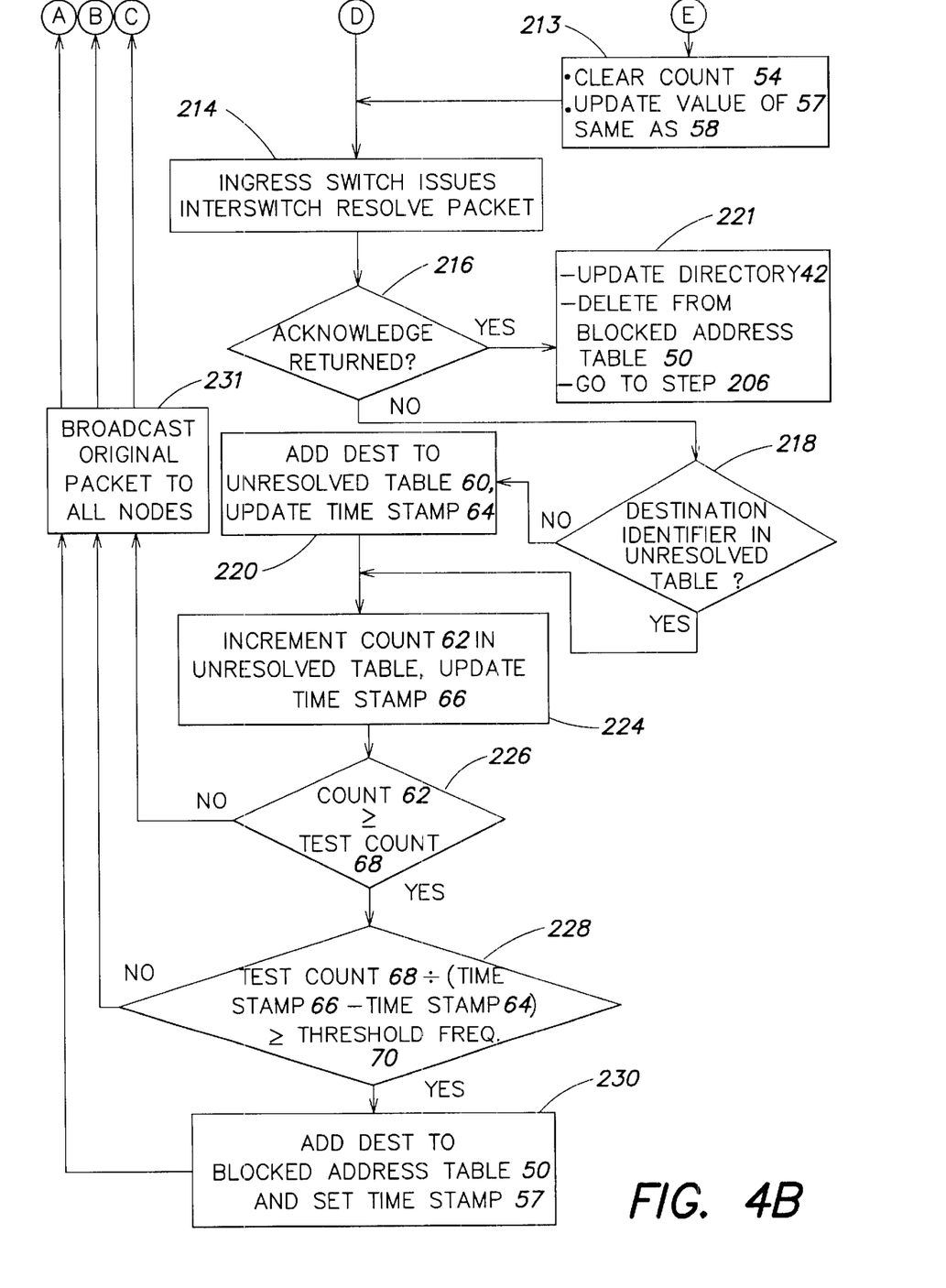

Referring now to FIGS. 4A and 4B, flow diagrams illustrate the operation of the switch when resolving destination addresses. In FIG. 4A at step 200, a source node issues a packet addressed to a destination node. At step 202, the ingress switch receives the packet from the local source node and searches the directory 42 for the address of the destination. If, at step 204 it is determined that the destination address is known by the directory, then the process proceeds to step 206, where the Success signal is asserted and the switch forwards the packet to the destination address (and the method returns to start).

If at step 204 the destination address is not known at the ingress switch, the Not Found signal is asserted and the process proceeds to step 208, where the output of the blocked address table 50 is examined to determine whether or not the destination address is blocked and consequently whether an interswitch resolve packet is to be issued from the ingress switch. If the address is stored in the blocked address table, then at step 210, the count 54 associated with the destination address is incremented and time stamp 58 is updated with the current time. At step 212, the difference between time stamps 57 and time stamp 58 is compared to the Send value 56. If the difference is less than the value in the Send value, then (in step 211) the Block signal is asserted to the NOT input of AND gate 43 and the interswitch resolve packet is blocked. The process then returns to the Start to await receipt of the next packet at the ingress switch. If the difference is equal to or greater than the Send value, then the Block signal is not asserted, the count value 54 is cleared, time stamp value 57 is updated to be the same as 58 (step 213), and the Issue Interswitch Resolve Packet signal is forwarded to the transmit logic of the switch to cause the interswitch resolve packet to be issued to the network at step 214 (FIG. 3B). The switch awaits receipt of responses from the other switches at step 216, i.e., either an Acknowledge response or an Unknown response. At step 216 if an Acknowledge signal is received, the directory 42 is updated (step 221), the destination identifier is removed from the blocked address table 50, and the process goes back to step 206, where the ingress switch forwards the packet to the destination node. If no acknowledgment is received at step 216, the process proceeds to step 218 described below.

If, however, at step 208 the address was not in the blocked address table 50, then the process proceeds directly to step 214 and an interswitch resolve packet is issued out over the network. At step 216, the switch awaits receipt of responses from the coupled switches. As mentioned above, each switch returns either an Acknowledge response or an Unknown response. In an alternate embodiment, when the address is unknown, rather than supply an Unknown response the switches may simply not respond to the interswitch resolve packet; then, failure to receive an Acknowledge within a given period of time allows the process to proceed on the basis of the destination being unresolved. Whichever method is used, at step 216 it is determined whether or not an Acknowledge signal was received at the ingress switch. If an Acknowledge signal was received, then (in step 221) the directory 42 in the ingress switch is updated with the destination address, and the process proceeds to step 206 where the ingress switch sends the packet to the destination node address.

If at step 216 no Acknowledge signal is received, then the process proceeds to step 218 where the unresolved address table 60 is checked to determine whether the destination identifier is already one of the unresolved destination identifiers. If not, then at step 220 the destination identifier is moved into the unresolved address table 60, the count 62 is incremented and time stamp 64 is set to mark the initial time that the destination identifier is stored in the table 60. If it is determined at step 218 that the destination identifier is already in the unresolved table 60, then the process proceeds to step 224 where the count 62 is incremented and the time stamp 66 is set to indicate the most recent reference to the destination identifier. At step 226, the value of the count field 62 is compared against the test count 68. If the count valve is greater than or equal to the test count, at step 228 the test set forth below in Equation I is applied:

$$\text{if (test count 68/(timestamp 66-timestamp 64))} < \text{threshold frequency 70 then do not block interswitch resolve packets to the destination;} \qquad \text{Equation I}$$

else
block interswitch resolve packets to the destination.

Thus, if the rate at which interswitch resolve packets are being issued out over the network is less than the threshold frequency, this indicates that the interswitch resolve packets for that destination identifier are not degrading the performance of the network. In such a situation, the time stamps and counter values corresponding to the destination identifier are reset in the unresolved address table 60. If the output of decision step 226 or decision 228 is NO, then the packet is broadcast to all nodes in an attempt to resolve the unknown destination (step 231). The process then returns to Start where the ingress switch awaits the receipt of the next request.

If, however, it is determined at step 228 that the rate at which interswitch resolve packets are being issued out over the network is equal to or greater than the threshold frequency, this indicates that too many interswitch resolve packets have been issued to the destination identifier in the given period of time. To prevent the interswitch resolve packets from unduly loading the network, the destination identifier is moved from the unresolved address table 60 to the blocked address table 50 at step 230 and the time stamp 57 in the blocked address table 50 is set for the destination identifier. The process then broadcasts the packet to all nodes in an attempt to resolve the unknown destination (step 231). The process then returns to Start to await receipt of the next request packet at the ingress switch.

In summary, the invention provides a method and apparatus for managing address resolve requests in a network that allows for the resolve requests to be propagated through the network without excessively reducing the overall system bandwidth. The above method and apparatus may be implemented either in hardware within the switch, or through the use of data structures and software routines executed by the switch. By using a blocked address function (e.g., table 50), interswitch resolve packets to destination identifiers may be effectively filtered to reduce the amount of times that such packets are issued over the network and concomitantly reduce the loading on the network. By providing a configuration function (e.g., table 140) in a preferred embodiment, selected destination identifiers may be precluded from being blocked to ensure that communication pathways are enabled as soon as the destination node becomes available in the network.

Having thus described various embodiments of the invention, numerous modifications within the scope of the invention will occur to those skilled in the art. Thus, this description and accompanying drawings are provided by way of example only and are not intended to be limiting.

What is claimed is:

1. A method for resolving destination addresses in a switched network system comprising a plurality of switches, the method comprising the steps of:

issuing, at one of the plurality of switches, one interswitch resolve packet to at least one other switch in the network system in response to a packet issued by an associated node for access to a destination when the address of the destination is unknown by the one switch; and selectively precluding the issuance of additional interswitch resolve packets to the at least one other switch in response to a second packet issued by an associated node for access to the destination in order to enhance performance of the switched network system.

2. The method according to claim 1, wherein the step of selectively precluding includes the steps of:

providing a threshold value for indicating how often interswitch resolve packets may be issued to resolve the destination address; and issuing interswitch resolve packets to resolve the destination address at a rate no greater than that determined by the threshold value.

3. The method according to claim 2, wherein the step of selectively precluding includes the step of:

designating at least one destination for which interswitch resolve packets are not selectively precluded.

4. The method according to claim 1, including:

providing a test count value and a threshold value; and when the amount of interswitch resolve packets sent regarding a given destination reaches the test count value, issuing interswitch resolve packets at a rate no greater than that determined by the threshold value.

5. The method according to claim 1, including:

monitoring the rate that interswitch resolve packets are issued for the destination; and if the rate exceeds a predetermined threshold value, implementing the selectively precluding step.

6. The method according to claim 1, wherein the step of issuing includes a step of examining a directory at the one switch to determine if the address of the destination is known by the one switch.

7. A switch for use in a switched network system, the switch comprising:

a directory for storing addresses of nodes in the network system known to the switch;

means for storing a destination identifier of a packet when the address of the destination is not stored in the directory of any of the switches in the switched network;

means for issuing resolve packets to attempt to resolve the destination address; and means for selectively precluding the issuance of resolve packets when a rate at which resolve packets have been issued exceeds a threshold value.

8. The switch according to claim 7, wherein the means for selectively precluding includes:

a send value for determining how often resolve packets should be allowed to issue.

9. The switch according to claim 8, wherein the means for selectively precluding includes:

an unblock value for determining when to stop implementing the selectively precluding means.

10. The switch according to claim 7, including:

means for storing destinations for which issuance of resolve packets should not be selectively precluded.

11. The switch according to claim 7, including:

a test count for indicating a number of resolve packets that are permitted to issue before determining whether to selectively preclude issuance of resolve packets;

a threshold value for determining a maximum rate that resolve packets are permitted to issue; and a count of the number of resolve packets that have been issued.

12. A switch for use in a switched network system, the switch comprising:

a directory for storing addresses of nodes in the network system known to the switch;

means for storing a destination identifier of a packet when the address of the destination is not stored in the directory of any of the switches in the switched network;

means for issuing resolve packets to attempt to resolve the destination address;

means for selectively precluding the issuance of resolve packets when a rate at which resolve packets have been issued exceeds a threshold value;

a test count for indicating a number of resolve packets that are permitted to issue before determining whether to selectively preclude issuance of resolve packets; and a count of the number of resolve packets that have been issued.

* * * * *

UNITED STATES PATENT AND TRADEMARK OFFICE
CERTIFICATE OF CORRECTION

PATENT NO.     : 6,456,624 B1
DATED          : September 24, 2002
INVENTOR(S)    : Eccles et al.

It is certified that error appears in the above-identified patent and that said Letters Patent is hereby corrected as shown below:

Column 11, lines 11-18, claim 11 should read as shown below:

11.    A switch for use in a switched network system, the switch comprising :
        a directory for storing addresses of nodes in the network system known to the switch;
        means for storing a destination identifier of a packet when the address of the destination is not stored in the directory of any of the switches in the switched network;
        means for issuing resolve packets to attempt to resolve the destination address;
        means for selectively precluding the issuance of resolve packets when a rate at which resolve packets have been issued exceeds a threshold value;
        a test count for indicating a number of resolve packets that are permitted to issue before determining whether to selectively preclude issuance of resolve packets;
        a threshold value for determining a maximum rate that resolve packets are permitted to issue; and
        a count of the number of resolve packets that have been issued.

Signed and Sealed this

Twenty-second Day of April, 2003

JAMES E. ROGAN
*Director of the United States Patent and Trademark Office*